UNITED STATES PATENT OFFICE.

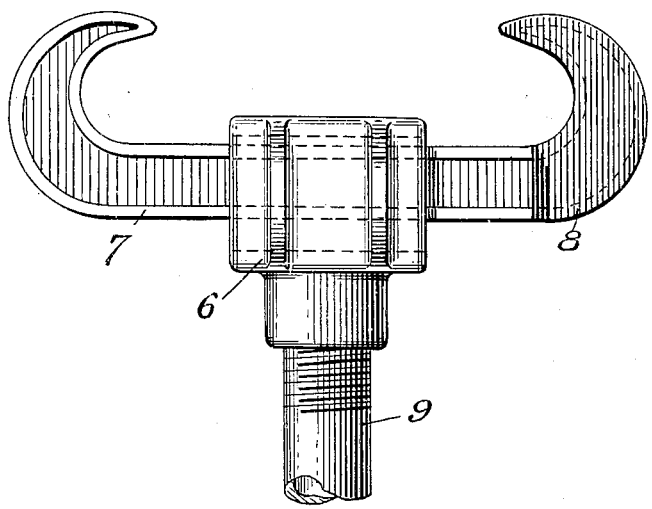
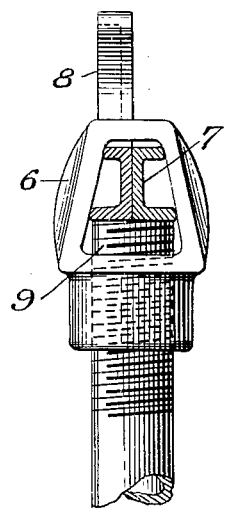
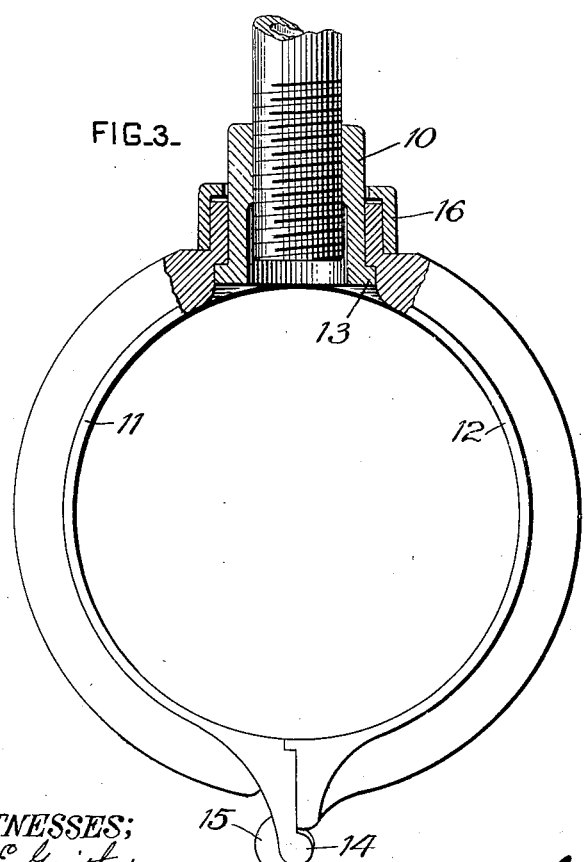
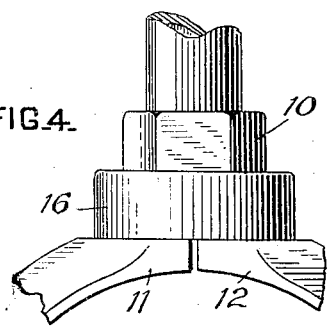
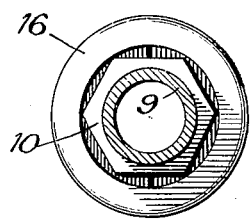

GEORGE W. HAYDEN, OF CHICAGO, ILLINOIS, ASSIGNOR TO CRANE COMPANY, OF CHICAGO, ILLINOIS, A CORPORATION OF ILLINOIS.

PIPE-HANGER.

No. 826,161.  Specification of Letters Patent.  Patented July 17, 1906

Application filed October 24, 1904. Serial No. 229,773.

*To all whom it may concern:*

Be it known that I, GEORGE W. HAYDEN, a citizen of the United States, residing at Chicago, in the State of Illinois, have invented certain new and useful Improvements in Pipe-Hangers, of which the following is a specification.

My invention relates to means for supporting or suspending pipes and the like from over-head beams, and it has for its principal objects, to simplify and cheapen the construction of pipe hangers, to provide an easily removable supporting ring with means for securely locking it when closed, and means for adjusting the pipe level, and to generally improve the structure and operation of such devices. These objects, and other advantages to hereinafter appear, I attain by means of the construction illustrated in preferred form in the accompanying drawing, wherein—

Figure 1 is a side elevation of the clamping head of the hanger, with its jaws;

Figure 2 is an elevation at right-angles to that of Figure 1, and showing the clamping jaws in section;

Figure 3 shows in side elevation the hanger ring, and in section its attachment to the suspending rod or pipe;

Figure 4 is a fragmentary side elevation similar to that of Figure 3, showing the adjusting nut and locking ring, and Figure 5 is a horizontal section and plan showing the adjusting nut at the top of the hanger ring.

While the device is applicable to any style of beam or other means for suspending the pipe, I have shown it in the drawing as adapted to engage the lower flange of an I-beam, and in such a construction the device is suspended from the I-beam by means of two hooked arms 7 and 8, which engage the lower flange of the beam and are slidably mounted in the head 6 in a manner to be presently described.

The head 6 is provided with a wedge-shaped opening tapering toward the top, for the reception of the arms 7 and 8 which have their adjacent faces flattened, and are provided upon their outer faces with upper and lower flanges of different depths corresponding with the taper of the sides of the opening as illustrated in Figure 2. The arms 7 and 8 are of a less height than the opening, and are forced into engagement with the tapering sides thereof and with each other, so as to clamp the whole together when they are pushed upward by screwing the suspending rod or pipe 9 into the head 6, as will be apparent and at the lower end of this rod or pipe is screw threaded into a suspending nut 10 which is provided with an annular flange 13.

The pipe to be supported is engaged by the hanger ring composed of the two arms 11 and 12 which may be hinged at the bottom by any desired device, but which I have shown as attached together by means of an eye having a cross bar 14 which engages the hook 15 on the arm 12. The two arms at the top are of proper form to fit neatly upon the nut 10 over the flange 13 for support thereon, and they are held together in place on the nut 10 by means of the ring 16 which slips down over an upwardly projecting collar on said two members. Both the ring and the arms 11 and 12 of course embrace the nut 10 above its supporting flange.

By this construction it will be seen that the arms 7 and 8 are readily adjustable to any size flange on the I-beam and that when put in place they are firmly locked against sliding upon one another by screwing the rod or pipe 9 up into the head 6 so as to closely wedge the said members in the head as heretofore described. The support for the pipe may be readily removed by lifting the ring 16 and opening arms 11 and 12, but without lifting the ring 16 it will be seen that it is impossible for the arms 11 and 12 to come off the support 10. It will also be observed that without removing the arms 11 and 12 the pipe may be raised or lowered to adjust the level or alinement by turning the nut 10 which as seen in Figure 5 is made in hexagonal form so as to accommodate a wrench. Various other advantages of the device will readily occur to those familiar with the art.

Having thus described my invention and illustrated its use, what I claim as new, and desire to secure by Letters Patent, is the following:

1. A pipe hanger comprising in combination, a head provided with an opening, arms fitting in said opening and slidable therein, and a suspension member screw-threaded in said head and adapted to engage the arms within said opening so as to clamp the parts of the device together.

2. A pipe hanger comprising in combination, a head provided with an opening, an arm fitting in said opening and slidable therein, and a suspension member screw-threaded in said head and adapted to engage the arms within said opening so as to clamp the parts of the device together.

3. A pipe hanger comprising in combination, a head provided with an opening having inclined sides, arms fitting in said opening and means adapted to force said arms into engagement with said inclined sides, so as to clamp the parts of the device together.

4. A pipe hanger comprising in combination, a head provided with an opening having inclined sides, an arm fitting in said opening and means adapted to force said arm into engagement with said inclined sides, so as to clamp the parts of the device together.

5. A pipe hanger comprising in combination, a threaded suspension rod, a head having a wedge-shaped opening and a pair of arms slidable therein, said rod screwing into the head and adapted to force said arms into engagement with the sides of the opening, so as to clamp the parts of the device together.

6. A pipe hanger comprising in combination, a head, suspension arms sliding therein, a supporting ring located below said head, a suspension member connecting the head and ring, said suspension member being adapted to clamp the arms in the head, and means connecting the ring and suspension member whereby the ring may be raised and lowered independently of the head, substantially as described.

In testimony whereof I have hereunder signed my name in the presence of the two subscribed witnesses.

GEORGE W. HAYDEN.

Witnesses:
F. W. H. CLAY,
ARCHWORTH MARTIN.